(12) United States Patent
Stephan et al.

(10) Patent No.: US 7,389,883 B2
(45) Date of Patent: Jun. 24, 2008

(54) FILTER CARTRIDGE

(75) Inventors: Nolwenn Stephan, Illkirch (FR); Sylvie Chavanne, Arlington, MA (US)

(73) Assignee: Millipore Corporation, Billerica, MA (US)

(*) Notice: Subject to any disclaimer, the term of this patent is extended or adjusted under 35 U.S.C. 154(b) by 544 days.

(21) Appl. No.: 10/517,461

(22) PCT Filed: Jun. 30, 2003

(86) PCT No.: PCT/EP03/06911

§ 371 (c)(1),
(2), (4) Date: Dec. 3, 2004

(87) PCT Pub. No.: WO2004/004864

PCT Pub. Date: Jan. 15, 2004

(65) Prior Publication Data

US 2006/0016746 A1    Jan. 26, 2006

(30) Foreign Application Priority Data

Jul. 4, 2002    (FR) .................................. 02 08415

(51) Int. Cl.
*B01D 35/30* (2006.01)
*B01D 35/00* (2006.01)

(52) U.S. Cl. ............... 210/454; 210/348; 210/433.1; 210/435; 210/437; 210/441; 210/442; 210/450; 210/451; 210/455; 210/477; 210/484; 210/486; 210/493.1; 210/497.01; 210/498

(58) Field of Classification Search ............. 210/348, 210/433.1, 435, 436, 437, 441, 442, 445, 210/450, 451, 454, 455, 457, 473, 477, 483, 210/484, 486, 487, 488, 493.1, 493.2, 497.01, 210/498

See application file for complete search history.

(56) References Cited

U.S. PATENT DOCUMENTS

| | | | | |
|---|---|---|---|---|
| 3,457,339 A * | 7/1969 | Pall et al. | | 264/162 |
| 4,032,688 A * | 6/1977 | Pall | | 428/36.1 |
| 4,112,159 A * | 9/1978 | Pall | | 428/36.1 |
| 4,228,012 A * | 10/1980 | Pall | | 210/238 |
| 4,231,768 A * | 11/1980 | Seibert et al. | | 96/128 |
| 4,521,309 A * | 6/1985 | Pall | | 210/493.2 |
| 4,536,291 A * | 8/1985 | Hoffmann et al. | | 210/457 |
| 4,579,698 A * | 4/1986 | Meyering et al. | | 264/41 |
| 4,981,231 A * | 1/1991 | Knight | | 215/341 |
| 5,230,760 A * | 7/1993 | Tanabe | | 156/69 |
| 5,685,443 A * | 11/1997 | Taber et al. | | 215/252 |
| 6,186,341 B1 * | 2/2001 | Konstantin et al. | | 210/488 |
| 2001/0013671 A1 * | 8/2001 | Parrinello | | 264/259 |

FOREIGN PATENT DOCUMENTS

| | | |
|---|---|---|
| DE | 199 19 289 | 2/2000 |
| EP | 0 062 867 | 10/1982 |
| GB | 1 327 382 | 8/1973 |

OTHER PUBLICATIONS

French Search Report, Feb. 24, 2003.

* cited by examiner

*Primary Examiner*—John Kim

(57) ABSTRACT

A filter cartridge which comprises a filter pack (3) formed by a flat filtering medium, a tubular sheath (2) with a perforated wall, surrounding the filtering pack, and two respective end caps (5) having a first disc (16) and a second disc (17) placed one on top of the other, each made from thermoplastic, with a portion of the filtering pack (3) situated along one of its edges and a portion of the sheath (2) situated along one of its edges (33) which are embedded in the second disc (17), with the first disc (16) having a peripheral rim (19) which surrounds the relevant portion of the sheath (2) and with the sheath having a shoulder (34) opposite the edge of the rim (19) of the first disc (16).

36 Claims, 4 Drawing Sheets

FILTER CARTRIDGE

CROSS REFERENCE TO RELATED APPLICATIONS

This application is the U.S. National Stage Application of International Application No.: PCT/EP2003/006911, filed on Jun. 30, 2003, which claims the benefit of French Application No.: FR 0208415, filed on Jul. 4, 2002.

The invention relates to filter cartridges.

Such a cartridge is already known, sold by the applicant under the name Durapore®, used for pharmaceutical or food applications, comprising a filtering pack formed by a flat filtering medium folded in a zigzag and closed on itself, having a tubular sheath with a perforated wall, surrounding the filtering pack, having a tubular core with a perforated wall, surrounded by the filtering pack, and having two respective end caps; the sheath, the core and the end caps each being made from the same polypropylene and being respectively injection moulded, a portion situated along the edge respectively of the core, the filtering pack and the sheath being embedded in each of the end caps.

To assemble this cartridge, the sheath, the filtering pack and the core are slipped in one another, in order to obtain a precartridge, the internal surface of the end caps is heated to a predetermined temperature, for example 250° C., and the end caps and the precartridge are brought together whilst keeping the caps and the precartridge aligned, the contact force exerted having the effect of making the above mentioned portion situated along the edge respectively of the sheath, the filtering pack and the core penetrate the material, softened by heating, of each of the end caps.

The invention relates, in this type of cartridge, and in all cases in the cartridges where both the sheath and the filtering pack are embedded in an end cap at least on one side, to obtaining conditions of penetration of the sheath and filtering pack in the end cap which are as good as possible.

For this purpose the invention proposes a filter cartridge comprising:
  a filtering pack formed by a flat filtering medium;
  a tubular sheath with a perforated wall, surrounding said filtering pack; and
  two respective thermoplastic end caps, in each of which there is embedded a portion of said filtering pack situated along one of its edges, and in each of which there is embedded a portion of said sheath situated along one of its edges;
  characterised in that:
  at least one said end cap has a first disc and a second disc, placed one above the other, each made from thermoplastic;
  it is in the said second disc that the said portion of the filtering pack and the said sheath portion are embedded;
  the said first disc has a peripheral rim which surrounds the said portion of the sheath; and
  the said sheath has a shoulder opposite the edge of the said rim of the first disc.

The two-disc structure of the end cap combined with the mutual arrangement of these discs, the filtering pack and the sheath makes it possible to benefit, in particular when the preferred characteristics disclosed below are implemented, from excellent holding of the sheath and filtering pack in the end cap, both with regard to impact resistance, during handling, and with regard to the ability to withstand high pressure in operation.

It should be noted in particular that, in the filter cartridge according to the invention, the first disc is involved in the cooperation between the end cap and the sheath and, consequently, in the cooperation between the end cap and the filtering pack, because the sheath surrounds the filtering pack including in the portions embedded in the end cap.

The conjoint intervention of the two discs of the end cap is also due to the fact that these two discs are each made from thermoplastic, unlike the two-material end caps already known, for example from International application WO 99/12629, where the two materials are distinct, for example an elastomer on the outside and a thermoplastic on the inside.

According to characteristics preferred for practical reasons of implementation and for the quality of the results obtained:
  the said portion of the sheath forms part of a neck which is thinner than the rest of the wall of the sheath; and possibly the said neck has a thickness which increases as from the edge of the sheath; and/or
  the said neck is situated between the edge and the said shoulder of the sheath; and possibly the edge of the sheath extends from an internal surface, situated in continuity with the general internal surface of the sheath, to a frustoconical surface which extends from the edge to the said shoulder, which extends from the said frustoconical surface to the general external surface of the sheath.

According to other preferred characteristics, for the same reasons, the said rim of the first disc extends projecting from a plate, and possibly the thickness of the said rim increases from its edge; and possibly the edge of the said rim extends from an external lateral surface, having substantially the same diameter as the general external surface of the sheath, to a frustoconical surface extending from this rim to the said plate.

According to other preferred characteristics, for the same reasons:
  the said shoulder of the sheath and the edge of the said rim have substantially the same width; and/or
  the said rim faces the said portion of the sheath embedded in the second disc through a surface which is frustoconical; and/or
  the said portion of the sheath embedded in the second disc faces the said rim through a surface which is frustoconical; and/or
  the said portion of the sheath embedded in the second disc and the said rim face each other through a respective frustoconical surface, the said respective frustoconical surfaces being similar; and/or
  the said rim has interruptions; and possibly the said interruptions are disposed at regular intervals and each extend over an arc with the same angle at the apex; and possibly said rim has four said interruptions each extending over an arc whose angle at the apex is approximately 30°; and/or
  the said first disc has, opposite to the said second disc, an annular rib; and/or
  at least one said end cap having a first disc and a second disc placed one above the other, has a central orifice; and possibly the first disc of the cap having a central orifice, has a rim around the said central orifice; and/or
  the cartridge also has a tubular core with a perforated wall, surrounded by the said filtering pack and having, along at least one edge, a portion embedded in the said second disc; and possibly each said portion of the core forms part of a thinner neck than the rest of the core; and possibly the edge of the core extends from an internal surface, situated in continuity with the general internal surface of the core, to a frustoconical surface which extends from the edge to the general external surface of the core.

According to other preferred characteristics, because it makes it possible to obtain particularly good characteristics of location of the sheath and particularly of the filtering pack in the end cap, the melt flow rate at 230° C. and at 2.16 kg, according to the ASTM D1238 or ISO 1133 test method, is lower for the material of the first disc than for the material of the second disc.

Preferably, having regard to the quality of the results obtained:
the said melt flow rate is no more than 15 g per 10 minutes for the material of the first disc; and more particularly the said rate of the first disc is between 4.2 and 6.5 g per 10 minutes; and/or
the said melt flow rate of the second disc is between 25 and 100 g per 10 minutes; and more particularly the said rate of the second disc is between 65 and 75 g per 10 minutes.

According to other preferred characteristics, for the same reasons, the said end cap having a first disc and a second disc, is moulded by bi-injection; and more particularly the said second disc is moulded onto the said first disc; and/or the said first disc and the said second disc are made from polypropylene; and more particularly the said first disc is made from homopolymer polypropylene whilst the second disc is made from copolymer polypropylene; and/or the said flat filtering medium forming the said filtering pack comprises a filtering membrane and two support layers sandwiching the said membrane; and possibly the said filtering medium also comprises a thermoplastic ribbon disposed in the vicinity of each edge of the said membrane; and/or possibly the said membrane is made from polyvinylidene fluoride (PVDF); and/or possibly the said support layers are made from thermoplastic; and/or possibly the said layers and a thermoplastic ribbon disposed in the vicinity of each edge of the said membrane are made from polypropylene.

According to other characteristics which are preferred, for reasons of balance between the two ends of the cartridge, each said end cap has a said first disc and a said second disc, and cooperates in a similar fashion with the sheath and the filtering pack.

THE BREIEF DESCRIPTION OF THE DRAWINGS

The disclosure of the invention will now be continued with a description of an example embodiment, given below by way of illustration and non-limitingly, with reference to the accompanying drawings. In these:

Figure 1:
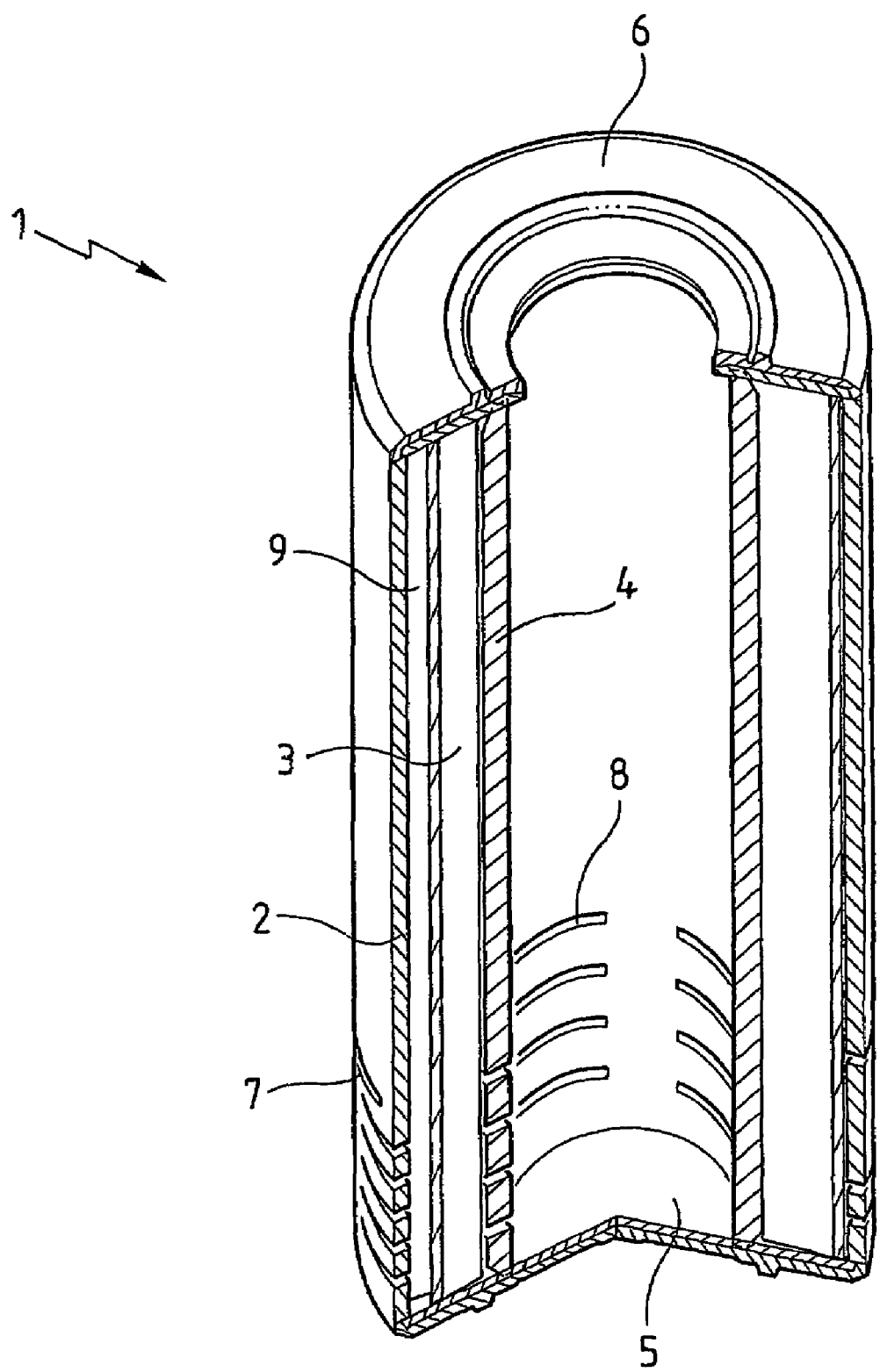
FIG. 1 is a perspective view with cutaway of a filter cartridge according to the invention.

The filter cartridge 1 illustrated in FIG. 1 comprises a sheath 2, a filtering pack 3, a core 4, a bottom end cap 5 and a top end cap 6. Here the cartridge 1 has a height of approximately 254 mm (10 inches) and an external diameter of approximately 69 mm.

The sheath 2 is made from moulded thermoplastic, here injected polypropylene. It has a tubular shape. Through its walls perforations 7 are formed, only some of which are depicted in FIG. 1, in order not to overload the drawing. The perforations 7 allow the passage of a liquid through the wall of the sheath 2.

What has just been said with regard to the sheath 2 is equally valid for the core 4, except that the perforations provided through its wall are referenced 8.

The core 4 has a diameter which is smaller than the diameter of the sheath 2. They are disposed concentrically, so that there exists between the sheath 2 and the core 4 a tubular space 9.

The end caps 5 and 6 are each made from moulded thermoplastic, here, just like the sheath 2 and the core 4, injected polypropylene.

A portion situated along the bottom edge 33 (FIG. 8) of the sheath 2 is embedded in the material of the cap 5, and the same applies to the core 4, so that the space 9 is closed at the bottom end of the cartridge 1 by the cap 5, and more precisely by the part of the latter which extends transversely between the sheath 2 and the core 4.

The same applies to the top edge of the sheath 2 and the bottom edge of the core 4 facing the cap 6, which therefore closes the top end of the chamber 9.

Figure 2:
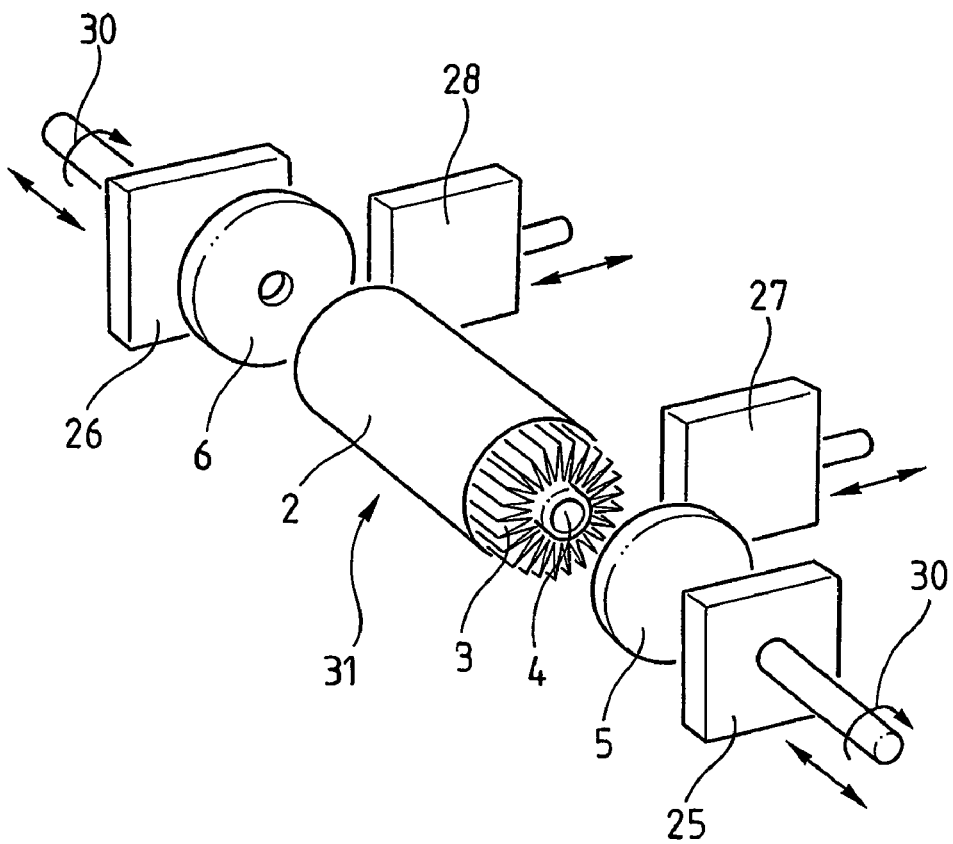
FIG. 2 is a perspective view showing schematically in exploded view the cartridge illustrated in FIG. 1 and supports and heating blocks used for assembling the end caps with the rest of the cartridge.

As can be seen more particularly in FIG. 2, the filtering pack 3 has overall, in cross-section, the shape of a star having a multitude of arms.

This pack is made from a flat filtering medium, folded in a zigzag and closed on itself by joining its two longitudinal ends. Here the pack 3 has one hundred and twenty-seven folds.

Just like the sheath 2 and the core 4, a portion situated along the bottom edge of the pack 3 is embedded in the material of the end cap 5 and a portion situated along the top edge of the pack 3 is embedded in the material of the cap 6.

Thus the space 9 is subdivided by the filtering pack 3 into two chambers situated respectively on each side of this pack, one of the chambers being in communication with the outside only through perforations 7 and the other chamber only through perforations 8.

Consequently, a liquid entering the space 9 through perforations 7 will be able to emerge therefrom, through the perforations 8, only after having passed through the filtering pack 3. The same applies of course for a liquid entering through the perforations 8 and leaving through the perforations 7.

The arrangement of the filtering medium 10 which with the pack 3 is made will now be described with the help of FIG. 3.

The medium 10 has a filtering membrane 11, here made from polyvinylidene fluoride (PVDF), a thermoplastic ribbon 12, here made from polypropylene, disposed in the vicinity of each edge 13 of the membrane 11, and, on each side of the membrane 11 provided with the ribbon 12, a respectively layer 14A and 14B, here made from non-woven polypropylene, the layers 14A and 14B offering to the membrane 11 a support enabling the filtering medium 10 to have a certain resistance to tearing.

Each ribbon 12 is applied to the membrane 11 whilst approximately 70% of its width, as from its edge situated on the side of the edge 13, is heated, and is therefore welded to the membrane 11. In the example illustrated, the edges of the membrane 11 and of the ribbon 12 are flush with each other, the ribbon 12 is welded to the membrane 11 over 7.5 to 8 mm as from the edge 13 whilst the ribbon 12 is in simple contact with the membrane 11 over the rest of its width, that is to say approximately 3 mm.

The layers 14A and 14B are in simple contact with the assembly formed by the membrane 11 and the ribbons 12.

The width of the layers 14A and 14B is slightly less than that of the membrane 13, so that the respective edges 15A and 15B of the layers 14A and 14B are recessed with respect to the edge 13. Here the distance between the edge 13 and the edge of the layers 14A and 14B is approximately 1 mm, or even between 0 and 2 mm.

The layer 14A, which is situated, with respect to the membrane 11, on the same side as the ribbon 12, is situated, in the filtering assembly 3, on the outside, that is to say on the side of the sheath 2, whilst the layer 14B is on the inside, that is to say on the side of the core 4.

In the example illustrated, provision is made for the liquid to be filtered to enter the space 9 through the perforations 7 in the sheath 2 and leaves it through the perforations 8 in the core 4.

The layer 14A is thus on the upstream side of the filtering medium 10 and the layer 14B on the downstream side.

Figure 3:
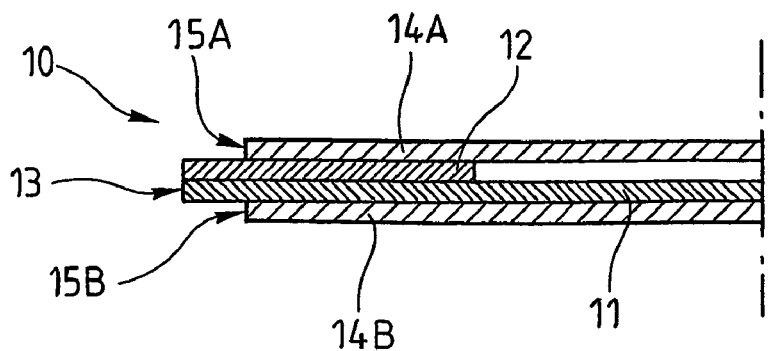
FIG. 3 is a partial view in section of the filtering medium included in the cartridge, showing in particular the arrangement of this medium at its edge, before assembly with an end cap.

It should be noted that, in FIG. 3, in order to simplify the drawing, the membrane 11, the ribbon 12 and the layers 14A and 14B are depicted with the same thickness, but that the membrane 11 is thicker than the ribbon 12 and less thick than the layers 14A and 14B. Here the membrane 11 has a thickness of 100 to 150 μm, the ribbon 12 has a thickness of approximately 50 μm and the layers 14A and 14B have a thickness of approximately 200 μm.

Figure 4:
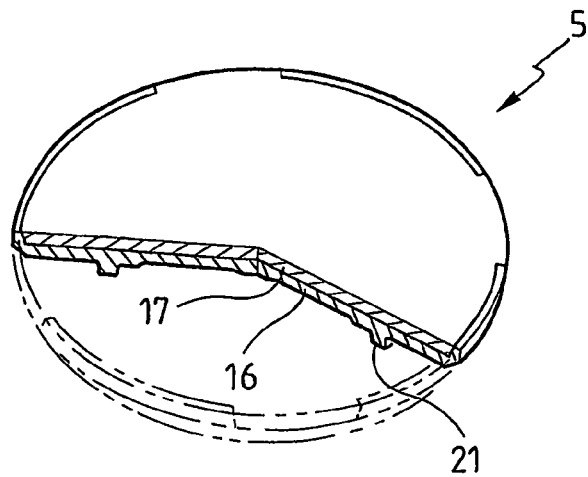
FIG. 4 is a perspective view with cutaway of the bottom end cap of the filter cartridge, showing the first disc which forms the external part of this cap and the second disc, moulded onto the first disc, which forms the internal part of this cap.
Figure 5:
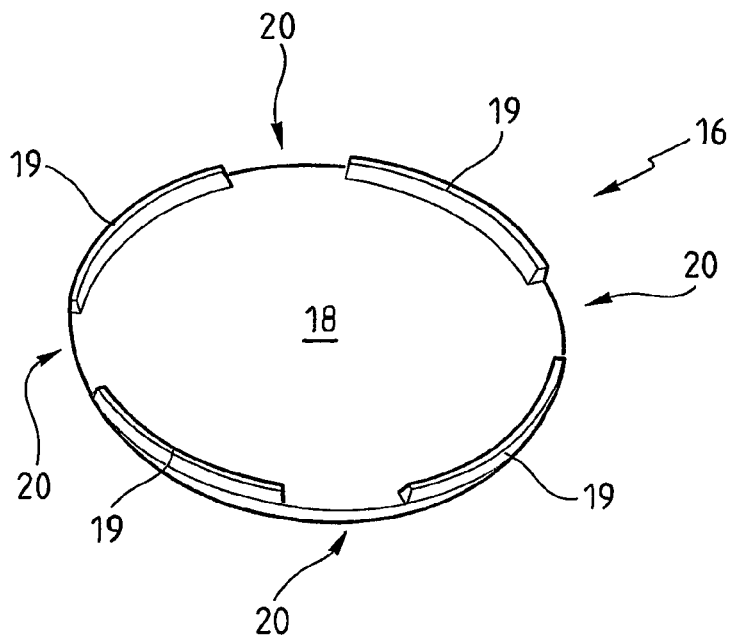
FIG. 5 is a perspective view solely of the first disc of the end cap.

The bottom end cap 5 will now described with the help of FIGS. 4 and 5.

As indicated above, this cap is made from thermoplastic, and more precisely polypropylene, injection moulded.

Even more precisely, the cap 5 is moulded by bi-injection. It has a first disc 16 made from a first grade of polypropylene and formed in a first injection operation, and has a second disc 17, made from another grade of polypropylene and moulded onto the first disc 16 in a second injection operation.

As can be seen more particularly in FIG. 5, the first disc 16 has a flat circular plate 18. On the side which can be seen at the top of the drawings, that is to say on the side which will be turned towards the inside of the cartridge 1, a peripheral rim 19 extends projecting from the plate 18. Here this rim is interrupted at regular intervals, with the segments of the rim 19 forming steps separated from each other by crenulations 20. There are more precisely here four crenulations regularly distributed from an angular point of view, each extending over an arc whose angle at the apex is approximately 30°.

On the side which can be seen at the bottom in the drawings, that is to say on the side designed to be situated outside the cartridge 1, the first disc 16 has a annular rib 21 whose diameter is approximately equal to two thirds of the diameter of the first disc 16.

It should be noted that the first disc 16 is shown alone in FIG. 5 in order to give a clear understanding of the invention but that in practice the disc 16 is not removed from the mould as it stands: when the two half-moulds which have been used for obtaining the disc 16 are separated, the latter remains in the half-mould situated on the bottom side whilst another top half-mould is substituted for the half-mould which was situated on the top side, the hollow existing between the disc 16 and the second top mould having the shape of the second disc 17, which is then formed by injecting the second grade of polypropylene into this hollow.

It should be noted that the crenulations 20 serve as a vent making it possible to perform the second injection by means of which the disc 17 is formed by moulding onto the disc 16.

Figure 6:
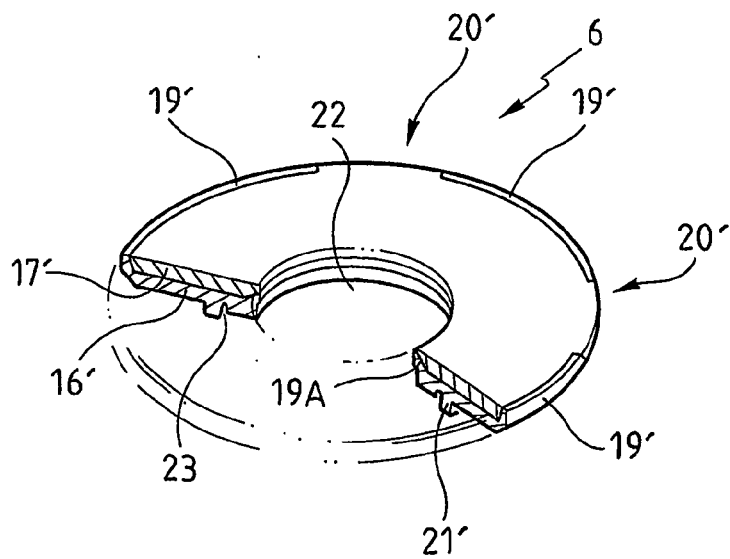
FIG. 6 is a view similar to FIG. 4, but for the top cap of the filter cartridge.

As can be seen in FIG. 6, the top end cap 6 is identical to the bottom cap 5, except that it has a central orifice 22, and except that the rib situated on the external side has a different profile. For the components of the cap 6 which are similar to those of the cap 5, the present document employs the same numerical references, but allocated a prime index.

Whilst the rib 21 is directly bordered, towards the centre, by a shoulder, the rib 21' is bordered, towards the centre, by a groove 23 useful, after assembly of the cartridge 1, for the fixing of a connecting piece. Around the orifice 22, the disc 16' has a rim 19A. Whilst the edge of the rims 19 or 19' is flush with the surface of the disc 17 or 17', the edge of the rim 19A is covered by the disc 17'.

It will now be explained how the filter cartridge 1 is assembled.

Figure 7:
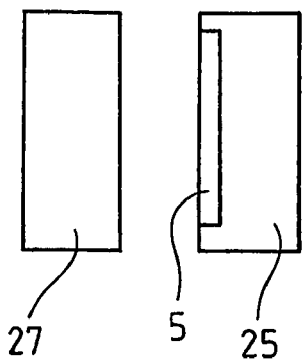
FIG. 7 is a schematic view in elevation and section showing the bottom end cap in place in one of the supports depicted in FIG. 2 and showing one of the heating blocks depicted in this figure disposed opposite the support, and therefore opposite the bottom end cap, in order to heat this cap, and more particularly the internal side thereof.

A bottom end cap 5 and a top end cap 6 are placed respectively in the support 25 and in the support 26 (FIG. 2), which each have for this purpose a hollow having the same contour as the cap, as can be seen in FIG. 7 for the support 25 and the cap 5, with the face designed to be towards the inside of the cartridge 1, which remains free.

The heating blocks 27 and 28 are then placed respectively in front of the support 25 and in front of the support 26, so that the surface of the caps 5 and 6 designed to be towards the inside of the cartridge heats up, whilst the blocks 25 and 26 are made to turn on themselves, as illustrated by the arrows 30 in FIG. 2.

The heating is continued until the aforementioned surface reaches a predetermined threshold temperature, for example situated between 250 and 270° C.

The heating blocks 27 and 28 are then withdrawn, the precartridge 31 formed by the sheath 2, the pack 3 and the core 4 slipped in one another are placed in alignment with the supports 25 and 26, and then the supports 25 and 26 are brought together by driving them in the axial direction, so that the end caps 5 and 6 are pressed against the precartridge 31.

Figure 8:
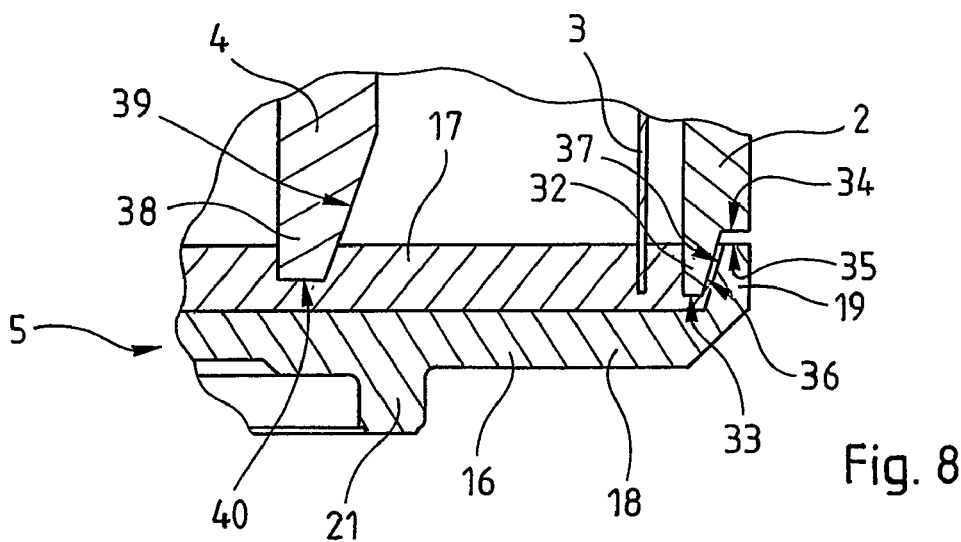
FIG. 8 is a partial view in elevation and section corresponding, in enlargement, to the part of FIG. 1 which can be seen at bottom right.
Figure 9:
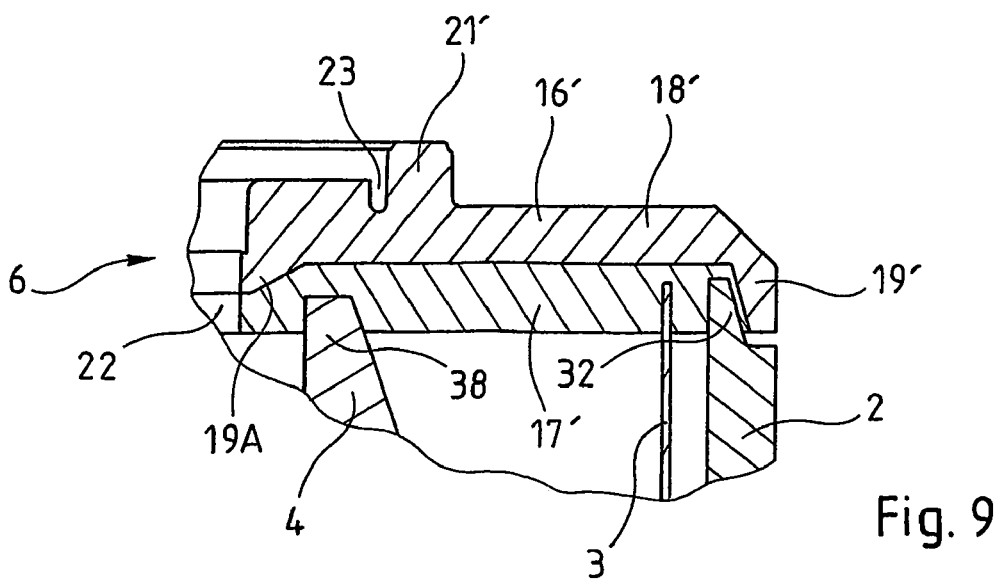
FIG. 9 is a view similar to FIG. 8, but for the portion of FIG. 1 which is seen at top right.

The contact force exerted has the effect of making a portion situated along the edge respectively of the sheath 2, the pack 3 and the core 4 penetrate the material, softened by heating, of each of the end caps 5 and 6, over a predetermined depth, as shown in FIG. 8 for the bottom end cap 5 and in FIG. 9 for the top end cap 6.

As can be seen clearly in the latter figures, it is more precisely in the disc 17 and in the disc 17' that the respective portions of the various constituents of the precartridge 31 are thus embedded.

The first disc 16 or 16' respectively of the end cap 5 and of the end cap 6 is made from a polypropylene whose melt flow rate is relatively low, typically from 5.2 g per 10 minutes at 230° C. and at 2.16 kg, according to the ASTM D1238 or ISO 1133 test method, for example such a rate lying between 4.2 and 6.5 g per 10 minutes, or even less than 15 g per 10 minutes.

It is here a homopolymer polypropylene sold under the name Escorene PP 1052 by Exxon Corporation (names belonging to their owners).

On the other hand, the polypropylene from which the second disc 17 or 17' respectively of the cap 5 and cap 6 are made has a relatively high melt flow rate, typically 70 g per 10 minutes according to the above mentioned test methods, for example such a rate between 65 and 75 g per 10 minutes, or even between 15 and 100 g per 10 minutes.

It is here the copolymer polypropylene sold under the name Inspire C711-70RNA from Dow Plastics (names belonging to their owners).

The thermoplastic from which the discs 16 and 16' are made, whose melt flow rate hot is, as has just been seen, much less high than that of the thermoplastic from which the discs 17 and 17' are made, also has better impact resistance, from which the end caps 5 and 6 benefit, which would have been relatively fragile if they had been entirely made from the thermoplastic employed for the discs 17 and 17'.

The rotation movement of the supports 25 and 26 on their axis, depicted in FIG. 2 by the arrows 30, prevents, or in any case reduces, the phenomena of gravity flow of the material of the caps 5 and 6 softened by heating.

By virtue of the relatively high fluidity when hot of the second discs 17 and 17', the penetration of the portions situated along the edges of the various constituents of the precartridge 31 is effected excellently.

The sheath 2, in this regard, has, at each of its ends, a neck 32 thinner than the rest of its wall.

As can be seen in FIG. 8, the neck 32 is situated between the edge 33 of the sheath 2 and a shoulder 34 on this sheath, a shoulder which has substantially the same width as the edge 35 of the rim 19 or 19'. The shoulder 34 extends between the general external surface of the sheath 2 and a frustoconical surface 36 extending itself from the shoulder 34 to the edge 33, the latter extending from the surface 36 to an internal surface situated in continuity with the general internal surface of the sheath 2.

The orientation of the slope of the surface 36 is such that the thickness of the neck 32 decreases between the shoulder 34 and the edge 33.

The rim 19 or 19' has a profile complementary to that of the neck 32, its internal lateral surface 37 being frustoconical and similar to the surface 36, its edge 35 being similar to the shoulder 34 whilst its external lateral surface is cylindrical and has substantially the same diameter as the general external surface of the sheath 2.

The core 4 also has a neck at each of its ends, referenced 38 in the drawings, this neck here being simply formed, as can be seen in FIG. 8, by a frustoconical surface 39 extending from the edge 40 of the core 4 to its external lateral surface (the surface facing the chamber 9), the slope of the surface 39 being substantially the same as that of the surfaces 36 and 37.

In the example illustrated, the second discs 17 and 17' typically have a thickness of 2.6 mm. Provision is made for the distance between the plate 18 or 18' of the first disc 16 or 16' and the edge of the various constituents of the precartridge 31 to be typically 0.6 mm for the sheath 2, 0.7 mm for the filtering pack 3 and 1.2 mm for the core 4.

With regard more particularly to the flat filtering medium 10, having regard to the values indicated above, its depth of penetration into the disc 17 or 17' is on average around 1.9 mm.

The relative ease of penetration due to the high fluidity when hot of the disc 17 or 17' offers the advantage of avoiding, on the occasion of the penetration into the end caps, the appearance, in the filtering medium 10, of stresses concentrated in some cases to a relatively great extent in the vicinity of the end caps, with the consequence of this concentration of stresses that the two respective zones of the medium 10 adjacent to the end caps would be weakened, and in particular would be subject to rupture by shearing under the effect of the pressure difference existing on each side of the medium 10 when the cartridge 1 is functioning.

It should be noted in particular, with regard to the reasons why the concentrations of stresses were avoided by virtue of the relative ease of penetration of the filtering medium 10 into the end caps, that, on the one hand, it suffices to exert, in order to effect this penetration, a very low force of bringing the caps 5 and 6 closer together, compared with that which will be necessary if the caps 5 and 6 were entirely made from the same polypropylene as the disc 16 and 16', the low intensity of the bringing-together force exerted here between the caps 5 and 6 avoiding making the filtering pack 3 take a curved shape, from which the result would be that the two adjacent respective regions of the edges of the medium 10 would have a tendency to fit in the end caps aslant, and, on the other hand, avoiding making the regions of the medium 10 adjacent to its respective edges that fold, at the time of penetration, through a buckling mechanism.

Thus the two adjacent regions of the respective edges of the medium 10, embedded in the cap 5 and in the cap 6, remain overall oriented in the axial direction. The result is an effective setting both of the layer 14A and of the layer 14B in the material of the caps 5 and 6, which constitutes an additional factor in resistance to shearing.

This is because each of the layers 14A and 14B which serves, when the cartridge is functioning, as far as possible to absorb the forces due to the pressure difference existing on each side of the filtering medium 10, here fully fulfils its role of reinforcement, both when the flow of the liquid to be filtered takes place in the nominal direction, that is to say in the direction in which the liquid circulates from the perforations 7 in the sheath 2 towards the perforations 8 in the core 4 (the highest pressure is then situated on the side of the layer 14A), than in the case of a circulation in the opposite direction (the highest pressure then being situated on the side of the layer 14B).

For each of the end caps 5 and 6, there is excellent cooperation between the discs 16 and 17 and between the discs 16' and 17'. In particular, the connection occurring at their interface is of excellent quality, because of the fact that it is a case of two thermoplastics, and more precisely, here, two polypropylenes and, moreover, because of their method of obtaining, by bi-injection.

In a variant which is not shown, the core 4 is replaced by a core which is free with respect to the end caps 5 and 6, no portion bordering its edges being embedded in an end cap.

In another variant which is not shown, the rim 19 has more than four crenulations or interruptions, or has no interruption and is therefore continuous.

In other variants which are not shown, only one of the end caps 5 and 6 has two discs such as 16 and 17 or 16' and 17'; thermoplastics other than polypropylene are employed for the various constituents of the cartridge; the discs of the end caps are obtained and integrated mutually other than by bi-injection; the filtering pack is shaped so as to fit within an overall circular contour other than by folding in a zigzag, for example by winding in a spiral; and/or various changes are made in the shapes and dimensions.

More generally, the invention is not limited to the examples described and depicted.

The invention claimed is:

1. Filtering cartridge comprising:
   a filtering pack formed by filtering medium;
   a tubular sheath with a perforated wall, surrounding said filtering medium, wherein there is a chamber between said filtering pack and tubular sheath; and
   two respective thermoplastic end caps, in each of which there is embedded a portion of said filtering pack situated along one of its edges, and in each of which there is embedded a portion of said sheath situated along one of its edges;
   characterised in that:
   at least one said end cap has a first disc and a second disc, placed one above the other, each made from thermoplastic;
   said second disc has said portion of the filtering pack and said sheath portion embedded;
   said first disc has a peripheral rim which surrounds said portion of the sheath; and
   said sheath has a shoulder opposite the edge of the said rim of the first disc.

2. The cartridge according to claim 1, wherein said portion of the sheath forms part of a neck thinner than the rest of the wall of the sheath.

3. The cartridge according to claim 1, wherein said portion of the sheath forms part of a neck thinner than the rest of the wall of the sheath and said neck has a thickness which increases from the edge of the sheath.

4. The cartridge according to claim 1, wherein said portion of the sheath forms part of a neck thinner than the rest of the wall of the sheath and said neck is situated between the edge and said shoulder of the sheath.

5. The cartridge according to claim 1, wherein the edge of the sheath extends from an internal surface, situated in continuity with the general internal surface of the sheath, to a frustoconical surface which extends from the edge to said shoulder, which extends from said frustoconical surface to the general external surface of the sheath.

6. The cartridge according to claim 1, wherein said rim of the first disc extends projecting from a plate.

7. The cartridge according to claim 1, wherein the thickness of said rim increases from its edge.

8. The cartridge according to claim 6, wherein the edge of said rim extends from an external lateral surface, having substantially the same diameter as the general external surface of the sheath, to a frustoconical surface extending from this rim to said plate.

9. The cartridge according to claim 1, wherein said shoulder on the sheath and the edge of said rim has substantially the same width.

10. The cartridge according to claim 1, wherein said rim faces said portion of the sheath embedded in the second disc through a surface which is frustoconical.

11. The cartridge according to claim 1, wherein said portion of the sheath embedded in the second disc faces said rim through a surface which is frustoconical.

12. The cartridge according to claim 1, wherein said portion of the sheath embedded in the second disc and said rim face each other through a respective frustoconical surface, said respective frustoconical surfaces being similar.

13. The cartridge according to claim 1, wherein said rim has interruptions.

14. The cartridge according to claim 1, wherein said rim has interruptions and said interruptions are disposed at regular intervals and each extend over an arc with the same angle at the apex.

15. The cartridge according to claim 1, wherein said rim has interruptions and said rim has four said interruptions each extending over an arc whose angle at the apex is approximately 30°.

16. The cartridge according to claim 1, wherein said first disc has, opposite to said second disc, an annular rib.

17. The cartridge according to claim 1, wherein at least one said end cap having a first disc and a second disc placed one above the other, has a central orifice.

18. The cartridge according to claim 1, wherein the first disc of the cap has a central orifice and has a rim around said central orifice.

19. The cartridge according to claim 1, wherein the first disc of the cap having a central orifice, has a rim around said central orifice, it also comprises a tubular core with a perforated wall, surrounded by said filtering medium and having, along at least one edge, a portion of said core embedded in said second disc.

20. The cartridge according to claim 19, wherein each said portion of the core forms part of a neck which is thinner than the rest of the core.

21. The cartridge according to claim 19, wherein the edge of the core extends from an internal surface, situated in continuity with the general internal surface of the core to a frustoconical surface which extends from the edge to the general external surface of the core.

22. The cartridge according to claim 1, wherein melt flow rate at 230° C. and under 2.16 kg, according to the ASTM D1238 or ISO 1133 test method, is lower for the material of the first disc than for the material of the second disc.

23. The cartridge according to claim 22, wherein said melt flow rate is no more than 15 g per 10 minutes for the material of the first disc.

24. The cartridge according to claim 22, wherein said melt flow rate of the first disc is between 4.2 and 6.5 g per 10 minutes.

25. The cartridge according to claim 22, wherein said melt flow rate of the second disc is between 25 and 100 g per 10 minutes.

26. The cartridge according to claim 22, wherein said melt flow rate of the second disc is between 65 and 75 g per 10 minutes.

27. The cartridge according to claim 1, wherein said end cap comprising a first disc and a second disc is moulded by bi-injection.

28. The cartridge according to claim 1, wherein said second disc is moulded onto said first disc.

29. The cartridge according to claim 1, wherein said first disc and said second disc are made from polypropylene.

30. The cartridge according to claim 1, wherein said first disc is made from a homopolymer polypropylene while the second disc is made from a copolymer polypropylene.

31. The cartridge according to claim 1, wherein said filtering medium forms a filtering pack containing a filtering membrane and two support layers sandwiching said membrane.

32. The cartridge according to claim 1, wherein said filtering medium also comprises a thermoplastic ribbon disposed in the vicinity of each edge of said medium.

33. The cartridge according to claim 1, wherein said filtering medium is at least a membrane which is made from polyvinylidene fluoride (PVDF).

34. The cartridge according to claim 1, wherein said filtering medium contains one or more support layers, said one or more support layers are made from thermoplastic.

35. The cartridge according to claim 34, wherein said layers and a thermoplastic ribbon disposed in the vicinity of each edge of said medium are made from polypropylene.

36. The cartridge according to claim 1, wherein each said end cap has said first disc and said second disc, and cooperates in a similar fashion with the sheath and the filtering medium.

* * * * *